(12) United States Patent
Crickmore et al.

(10) Patent No.: US 11,199,465 B2
(45) Date of Patent: Dec. 14, 2021

(54) FIBRE OPTIC DISTRIBUTED SENSING (71) Applicant: OPTASENSE HOLDINGS LIMITED, Farnborough (GB)

(72) Inventors: Roger Crickmore, Farnborough (GB); Andrew Ridge, Farnborough (GB)

(73) Assignee: Optasense Holdings Limited

( * ) Notice: Subject to any disclaimer, the term of this patent is extended or adjusted under 35 U.S.C. 154(b) by 507 days.

(21) Appl. No.: 15/307,476

(22) PCT Filed: May 8, 2015

(86) PCT No.: PCT/GB2015/051358
§ 371 (c)(1),
(2) Date: Oct. 28, 2016

(87) PCT Pub. No.: WO2015/170114
PCT Pub. Date: Nov. 12, 2015

(65) Prior Publication Data
US 2017/0045410 A1    Feb. 16, 2017

(30) Foreign Application Priority Data
May 8, 2014    (GB) ..................... 1408125

(51) Int. Cl.
*G01M 3/00* (2006.01)
*G01D 5/353* (2006.01)
(Continued)

(52) U.S. Cl.
CPC ........ *G01M 3/002* (2013.01); *G01D 5/35361* (2013.01); *G01K 11/32* (2013.01); *G01M 3/047* (2013.01); *G01M 3/243* (2013.01)

(58) Field of Classification Search
CPC ...... G01M 3/002; G01M 3/243; G01M 3/047; G01K 11/32; G01D 5/35361
See application file for complete search history.

(56) References Cited

U.S. PATENT DOCUMENTS 9,287,972 B2    3/2016    Kishida et al.
9,322,740 B2    4/2016    Liu et al.
(Continued)

FOREIGN PATENT DOCUMENTS

CH    1712919         12/2006
CN    1712919 A      12/2005
(Continued)

OTHER PUBLICATIONS

Saudi Arabian Office Action dated Feb. 7, 2020, in connection with Saudi Arabian Patent Application No. 516380242, 10 pages.
(Continued)

*Primary Examiner* — Lisa M Caputo
*Assistant Examiner* — Janice M Soto
(74) *Attorney, Agent, or Firm* — McDonnell Boehnen Hulbert & Berghoff LLP (57) ABSTRACT

A method of distributed fibre optic sensing is described. In an example, a series of interrogations are launched into an optical fibre, each interrogation comprising interrogating radiation in at least one pulse pair, wherein the pulses of a pulse pair are introduced to the optical fibre with a time interval therebetween. Radiation backscattered therefrom is sampled, so as to obtain at least one sample from each interrogation. Phase modulation in the samples is determined and components of the phase modulation which are below a threshold frequency are isolated. Such a method of sensing could be used, for example, to monitor changes in temperature of the optical fibre.

24 Claims, 5 Drawing Sheets

(51) Int. Cl.
    *G01K 11/32*     (2021.01)
    *G01M 3/24*     (2006.01)
    *G01M 3/04*     (2006.01)

(56) References Cited

U.S. PATENT DOCUMENTS

| | | |
|---|---|---|
| 9,435,668 B2 | 9/2016 | Biggerstaff et al. |
| 2006/0010973 A1* | 1/2006 | Brown ............... E21B 47/1005 |
| | | 73/204.11 |
| 2009/0132183 A1 | 5/2009 | Hartog et al. |
| 2013/0103978 A1 | 11/2013 | Meyer et al. |
| 2013/0301978 A1 | 11/2013 | Meyer et al. |

FOREIGN PATENT DOCUMENTS

| | | |
|---|---|---|
| CN | 1712919 | 12/2006 |
| CN | 201521291 U | 7/2010 |
| CN | 102322880 | 1/2012 |
| EP | 2 765 400 | 8/2014 |
| GB | 2 222 247 | 2/1990 |
| GB | 2442745 | 4/2008 |
| WO | 2012/137021 | 10/2012 |
| WO | 2012/137022 | 10/2012 |
| WO | 2013/051196 | 4/2013 |

OTHER PUBLICATIONS

Instituto Nacional Da Propriedade Industrial, Office Action dated May 29, 2020, issued in connection with Brazilian Application No. BR112016025888-6, 4 pages.

* cited by examiner

FIBRE OPTIC DISTRIBUTED SENSING

FIELD OF THE INVENTION

This application relates to fibre optic distributed sensing, and in particular but not exclusively to methods and apparatus for detecting variations such as temperature or strain variations using fibre optic distributed sensing.

BACKGROUND OF THE INVENTION

Fibre optic sensing is a known technique where an optical fibre, deployed as a sensing fibre, is interrogated with interrogating radiation. Radiation which emerges from the fibre is detected and analysed to determine environmental changes acting on the optical fibre. Some fibre optic sensors rely on deliberately introduced features within the fibre, e.g. fibre Bragg gratings or the like, to induce reflection from a point in the fibre. In a fibre optic distributed sensor however the radiation which is backscattered from inherent scattering sites within the fibre is detected. The sensing function is thus distributed throughout the fibre and the spatial resolution and arrangement of the various sensing portions depends on the characteristics of the interrogating radiation and the processing applied.

Fibre optic sensors for distributed temperature sensing (DTS) are known. These rely on detecting light which has been subjected to Brillouin and/or Raman scattering. By looking at the characteristics of the Brillouin frequency shift and/or the amplitudes of the Stokes/anti Stokes components, the absolute temperature of a given sensing portion of fibre can be determined. DTS is a useful technique with a range of applications but most DTS systems require relatively long time averages, typically tens of seconds or more, to provide the desired accuracy, meaning such DTS systems are less useful for detecting relatively rapid changes in temperature. Also, even with several minutes of averaging, the resolution of DTS system is typically 0.01° C. or lower.

Fibre optic sensors for distributed acoustic sensing (DAS) are also known, including sensors based on Rayleigh backscattering of light from the various inherent scattering sites within an optical fibre. A mechanical vibration of the fibre, such as caused by an incident acoustic wave, will alter the distribution of scattering sites resulting in a detectable change in the properties of the Raleigh backscattered light. Analysing such changes allows vibrations/acoustic stimuli acting on sensing portions of the optical fibre to be detected.

UK patent application GB2,442,745 (AT&T) describes distributed acoustic sensing using an optical fibre. This document teaches use of pulse pairs, wherein the individual pulses of a pulse pair have different frequencies. This document teaches demodulating the detected backscatter signal at the known frequency difference between the pulses in a pulse pair to provide in-phase (I) and quadrature (Q) signals for the carrier frequency. These are then converted to provide the phase and amplitude of the carrier signal. The phase of successive samples from the same section of fibre is then monitored to determine any acoustic signals incident on that section of fibre.

International Patent Applications WO2012/137022 and WO2012/137021 also describe DAS methods and apparatus involving launching interrogating radiation (which may be pulse pairs) into an optical fibre. In WO2012/137021, a plurality of samples corresponding to each sensing portion of interest are acquired and combined according to a quality metric, which may be a measure of the degree of similarity of the processed data from the channels, to give an overall output for that section of fibre. In WO2012/137022, interrogating radiation including at least first and second pulse pairs are launched into an optical fibre. The first and second pulse pairs are generated such that the phase relationship of the pulses of the first pulse pair has a predetermined relative phase difference to the phase relationship of the pulses of the second pulse pair.

US2009/132183 describes the use of Brillouin backscattering in an optical fibre to determine temperature, which may be supplemented with information obtained from narrow-band Raleigh backscatter and/or Raman scattering.

All of the above documents are incorporated herein by reference to the fullest extent allowable.

SUMMARY OF THE INVENTION

According to an aspect of the present invention, there is provided a method of distributed fibre optic sensing comprising performing a series of interrogations of an optical fibre, each interrogation comprising launching at least one interrogating pulse pair into the fibre, wherein the pulses of a pulse pair are introduced to the optical fibre with a time interval therebetween, sampling optical radiation which is Rayleigh backscattered from within said fibre to obtain at least one sample from each interrogation; and determining any phase modulation in the samples, wherein the step of determining the phase modulation comprises isolating components of the phase modulation which are below a threshold frequency.

As will be appreciated, such a method will identify low frequency phase shifts, i.e. relatively slow acting changes to the path length within a given section of fibre. This could include strain or temperature changes. Such a sensor could, for example, be used for detecting a leak in a pipeline by detecting a change in temperature due to the Joule-Thomson effect, for example by arranging the fibre in or near a pipeline. In contrast therefore with known DAS systems, it is only lower frequency phase changes which are considered.

In known DAS systems, the lower frequency ranges of the phase change information is usually ignored, or is filtered out as noise, in order to obtain acoustic signals found in the upper frequency ranges of phase change information. However, and as will be familiar to the skilled person, some prior art DAS systems have employed low-pass filters in the processing of data to recover phase. In particular, in IQ processing, low pass filters are used to remove the 2 ω components, and any components at ω which result from any DC terms in the input signal being multiplied by the sin and cos terms to form I and Q components. However, in such examples, the low pass filtering does not have the effect of isolating low frequency components of the phase modulation of the samples from higher frequency components of the phase modulation (e.g. isolating phase modulations which are below threshold frequency)- instead, it removes artefacts created in the processing of the data.

Preferably, the method comprises obtaining a plurality of samples from each interrogation, each of the samples being obtained at a different time following launch of the pulse pair. This allows different portions of fibre to be monitored. Each of the samples preferably comprises an interference signal comprising backscattered radiation from the first pulse and backscattered radiation from the second pulse. This is advantageous as it allows the portion of fibre between the pulses of the pulse pair within the fibre to be considered.

Each of the samples from a given interrogation is preferably related to a portion of the fibre. Any phase change may be determined between samples from different (for example consecutive) interrogations of the fibre which are related to the same portion of fibre. This is a convenient way of determining any phase modulation on that portion of fibre.

In one embodiment, the method may comprise a method of determining temperature changes, for example in the fibre, or in the vicinity of the fibre. The method may further comprise determining the temperature change using a predetermined relationship between the phase change and the temperature change of the fibre.

In another embodiment, the method may comprise a method of determining changes to the strain of fibre. Such changes can also be relatively slow acting and therefore are apparent as low frequency phase changes.

In some embodiments, the method may comprise performing low-pass filtering to isolate the low frequency components below a threshold frequency. In such embodiments, in the step isolating the lower frequency component of the phase modulation, the threshold may be between approximately 0.1 Hz to 1 Hz. In other examples, the threshold may be between approximately 0.1 Hz to 2 Hz or between approximately 0.1 to 5 Hz. It will be appreciated that the threshold may be determined with reference to (i) the signal of interest to be retained and/or (ii) the frequency of the likely signals which could influence the optical path length within a portion of fibre, but are not of interest in the particular sensing function. For example, a frequency cut off between approximately 0.1 Hz to 1 Hz will result in the majority of acoustic data relating to sound waves which may be incident on the fibre under test being removed. However, the threshold may be chosen to be high enough to include the fastest acting change in the signal region of interest (e.g. the fastest acting temperature change anticipated or to be monitored).

The threshold frequency may therefore depend on the environment in which the fibre is arranged (an above ground detector may generally have a different threshold to a below ground detector, for example), and the type of signals which it is anticipated will be incident thereon.

As mentioned above, in some embodiments, the method may comprise performing low-pass filtering to isolate the low frequency components. This is a convenient way of isolating low-frequency components. However, in some examples, the low frequency temperature signal may be the dominant signal, as has been found in particular in 'downhole' applications of DAS, particularly in tight gas wells. In such cases, isolation of the lower frequency signal may not require filtering the signal with regard to frequency.

In one embodiment, the step of sampling may comprising sampling a phase modulated carrier signal in the backscattered radiation. This carrier signal is preferably related to radiation returned from a given portion of fibre (a given channel) over successive pulse pairs, so may be acquired at the same time after each launch of a pulse pair. There may be a plurality of such 'channel' signals generated to allow different portions of the optical fibre to be monitored.

The method may further comprise demodulating the channel signals, for example by multiplying the channel signals by sin and cosine terms at the carrier frequency to provide in phase (I) and quadrature (Q) terms. These terms may be low-pass filtered to isolate the low frequency modulation (i.e. before the I and Q terms are combined to determine the phase modulation). While low pass filtering could additionally or alternatively be carried out once the phase modulation has been determined, filtering the I and Q terms prior to combining them can improve the stability of the demodulation.

In some embodiments, the pulses of a pulse pair may have mutual frequency difference. This is advantageous as it allows a returned interference signal to be readily identified. Determining a phase modulation across samples originating from the same portion of fibre from different pulse pairs allows any changes in optical path in that portion to be determined.

In some embodiments, the method may further comprise compensating for noise in the interrogating radiation. This is particularly advantageous if the noise signal is likely to lie in the signal band of interest.

In particular, in preferred embodiments, the source of the interrogating radiation may comprise a laser and the method may comprise identifying laser phase noise and compensating for the laser phase noise in processing the signal. Laser phase noise is due to a slow drift in the wavelength of the laser generating the interrogating radiation. This can impose a similar phase shift as a slow acting stimulus and may therefore be difficult to distinguish from the signal of interest e.g. strain or temperature change.

Moreover, laser phase noise may in some embodiments be a significant component of the phase change signal at low frequencies (say, under 1 Hz). However, phase noise produces a signal that is the same throughout the fibre. Therefore, the method may comprise providing a portion of the fibre which is at least substantially shielded from at least some other slow acting changes (e.g. is in a temperature stable environment, to shield from temperature changes), and using the backscatter signal from this shielded section of fibre to provide an indication of laser phase noise.

As laser phase noise is consistent throughout the fibre, an alternative or additional method of determining laser phase noise may comprise calculating the mean signal returned from at least some, and possibly each, portion of the fibre (i.e. each channel). In some embodiments, the signal from some (preferably most) portions of the fibre could be used to determine the mean, but signals returned from those portions which have high levels of low frequency signal from other sources such as the signal of interest or high levels of noise due to a low carrier signal could be excluded. These methods have the advantage that no shielded section of fibre is required, but assume that the low frequency signal of interest in the portions of fibre used to calculate the mean are uncorrelated (as, for example, if the whole fibre was subjected to the same temperature change, this temperature signal would also be consistent across all channels, and difficult to distinguish from noise).

The method may comprise compensating for laser phase noise by subtracting a determined noise signal from acquired samples. This therefore allows other low frequency signals, such a temperature changes, to be more readily identified. As would be appreciated by the skilled person, the step of compensating for laser phase noise may be carried out after the signal of interest has been obtained, for example by taking the arctan of the I and Q components.

In one example, the method further comprises acquiring a plurality of diversity samples (i.e. a number of different samples) of radiation backscattered from a sensing portion of interest of the fibre, e.g. a measurement channel, and processing said diversity samples to provide an overall measurement value for that sensing portion. Such a method may comprise dividing a plurality of samples into a plurality of processing channels, each corresponding to samples originating from sections of the fibre (where the sections are arranged to overlap, at least in part, with the fibre sensing portion of interest). The method may further comprise processing at least some of said plurality of processing channels to determine at least phase data for said channel; applying a quality metric to the data from processing channels; and combining the determined phase data for said channels into an overall phase value for the fibre portion of interest based on the results of applying said quality metric.

Therefore, several readings, which may be from overlapping sections of the fibre (channels), are obtained for one portion of interest. This technique can be used as described in greater detail in WO2012/137021 as a form of diversity processing. As several readings are taken for each portion of interest (the portion of interest being such that a stimulus is likely to affect all of these samples/channels), the results can be used according to the quality metric to ensure that poor quality signals (for example, those suffering from 'fading', in which destructive interference occurs in the radiation reflected for at least of the pulses resulting in a low carrier signal) do not unduly affect the result for that portion of fibre. The method is based on the observation that a signal of interest will be observed, and be fairly consistent, over several channels (i.e. along a length of the fibre).

In WO2012/137021, the signal is high-pass filtered to remove any DC offset. As this could also remove the slow-acting signal of interest desired in the present embodiment, such filtering may not be carried out and the quality metric may instead be based on a determination of the level of signal at high frequency (with lower levels being favoured), or the ratio between the signal at low frequency (e.g. 2-20 Hz) and the signal at high frequency (with higher ratios being favoured), or the maximum differential with respect to time of the signal (with low values being favoured).

In some embodiments, the quality metric acts to select the best channels (for example those exceeding a threshold value, or the best n channels, where n is an integer) to be combined. In such embodiments, the method may further comprise adding a DC offset (which may be a negative offset) to the mean of the channels selected through use of the quality metric, which may be determined such that, when the selected channels change, the processor determines the difference between the mean of the newly selected set of channels and the previously selected set of channels and changes the DC offset so that there is no step in the data. It may further be desirable to taper the change, such that the DC offset is changed over a number of successive samples for a given fibre portion of interest.

Such 'quality metrics' and associated methods may also be used in other DAS systems and methods.

In other embodiments, in particular those which comprise demodulating a phase modulated carrier (channel) signal, failure in demodulation may be detected and this could be used as a quality metric. Such a failure in demodulation may be indicated by a $2\pi$ phase change, or anticipated by a low carrier to noise ratio. Data for channels suffering from demodulation failure could be replaced with data from one or more other (for example, neighbouring) channels not suffering from demodulation failure. Such a method of removing poor phase information may be advantageous when considering backscattered radiation at any frequency range (i.e. at the low frequency ranges described herein and at higher frequency, for example acoustic, frequency ranges), and therefore may be used in other DAS methods.

In some embodiments, the high frequency phase change data may be retained and, in a separate processing step, the method may also be arranged to detect acoustic signals and may comprise, for at least one sensing portion of said optical fibre, comparing the detected phase and/or intensity of samples from one or more interrogating pulse to provide a measurement signal indicative of any acoustic stimuli acting on that sensing portion. In some applications the acoustic signals may be correlated with the detected low frequency effects to provide identification of events of interest. For example as mentioned the sensing fibre may be arranged along the path of a pipeline and detecting of localised temperature changes, e.g. due to the cooling effect of escaping pressured gas, or localised strain changes, e.g. caused by ground heave due to escaping gas, may be used as possible indicators of a leak. The acoustic signals from such portions of the optical fibre may also be analysed to detect characteristic acoustic signals associated with a leak to provide confidence in leak detection. In another example a fibre cable could be installed down an oil or gas well and used to monitor temperature changes that are induced by the motion of fluids into or along the well. Such measurements could be used to provide information on a variety of processes including flow, and cross well communication when fracking.

In some embodiments the temperature sensing could be a secondary detection effect. For instance an optical fibre could be at least partly deployed within or coupled to a material that exhibits temperature changes in response to certain stimuli or in the presence of certain compositions. For instance, sections of the fibre could be coated with a material that exhibits an exothermic or endothermic reaction in the presence of a given chemical composition. Any significant temperature changes in the coated sections could indicate the presence of the composition. Sections of the fibre could also be uncoated to provide a control indication of environmental temperature changes (or else a separate fibre could be provided without a coating). Therefore, the method may be arranged, indirectly, to sense the presence of the composition.

According to second aspect of the present invention, there is provided a distributed fibre optic sensor apparatus comprising: an optical source configured to, in use, launch a series of interrogations, each comprising at least a pulse pair into an optical fibre, wherein the pulses of a pulse pair are introduced to the optical fibre with a time interval therebetween; a sampling detector configured to, in use, sample radiation which is Rayleigh backscattered from within said optical fibre from the interrogations; a processor configured to determine any phase modulation in the samples, the processor being arranged to isolate components of the phase modulation below a threshold frequency.

Such a sensor could, for example, be used for detecting a leak in a pipeline by detecting changes in temperature, where the fibre is arranged in, or in the vicinity of, the pipeline. The change in temperature would be, relative to other disturbances (vibrations due to earth movements or incident sound waves or the like), a slow acting change, which would therefore result in a low frequency change to the phase of backscattered signal.

Therefore, in one embodiment, the sensor apparatus is a temperature sensor apparatus. In such examples, the processor may be further arranged to determine the temperature change using a predetermined relationship between the phase change and the temperature of the fibre.

In such embodiments, the processor comprises at least one low pass filter arranged to isolate a frequency component of the phase modulation. Such filter(s) may be arranged to isolate frequency components below a threshold. The threshold may be, for example, between approximately 0.1

Hz to 1 Hz. In other examples, the low pass filter(s) may be arranged to isolate components of the determined phase modulation below a threshold between approximately 0.1 Hz to 2 Hz.

In one embodiment, the sampling detector may be configured to, in use, sample interrogating radiation which is backscattered from within said optical fibre at a predetermined carrier frequency; and the processor is arranged to demodulate the phase modulated carrier signal (the channel signal) by multiplying the channel signal by sin and cosine terms at the carrier frequency to provide in phase (I) and quadrature (Q) terms, and I and Q terms are passed to low-pass filter(s) which are arranged to isolate the low frequency modulation.

In some embodiments, the pulses of a pulse pair may have mutual frequency difference.

In some embodiments, the sensor apparatus may be arranged to compensate for noise in the interrogating radiation. In particular, in preferred embodiments, the optical source may comprise a laser and the processor may be arranged to estimate laser phase noise and to compensate for the laser phase noise in processing the signal. The processor may be arranged to estimate the laser phase noise by averaging the mean signal of some or all the channels, and/or from determining a signal returned from a portion of fibre which is otherwise shielded from at least some low frequency signals (for example in a temperature stable environment). The processor may further be arranged to compensate for noise, for example by subtracting the estimated noise signal from acquired samples.

In one example the processor is further arranged, following each launch, to obtain a plurality of samples for each interrogation and to divide said plurality of samples for each interrogation into a plurality of processing channels, each corresponding to a sample returned from a section of fibre, wherein each section lies, at least in part, in a fibre portion of interest (where the sections may be overlapping sections). The processor may be further arranged to process at least some of said plurality of processing channels to determine at least phase data for said channel; apply a quality metric to the data from processing channels; and combine the determined phase data for said channels into an overall phase value for the fibre portion of interest based on the results of applying said quality metric. This method may be repeated for different portions of interest along the fibre.

In preferred embodiments, the quality metric acts to select the best channels (for example according to a threshold value, or the best n channels) to be combined. In such embodiments, the processor may further be arranged to add a DC offset to the mean of channels selected through use of the quality metric, which may be determined such that, when the selected channels change, the processor determines the difference between the mean of the new selected and the previously selected set of channels and changes the DC offset so that there is no step change in the data. It may further be desirable to taper the data. To that end, the processing circuitry may be arranged to vary the DC offset gradually between a number of successive samples for a given portion of interest.

In some embodiments the sensor may also be arranged to detect acoustic signals and the processor may be arranged to compare the detected phase and/or intensity from one or more interrogating pulses for at least one sensing portion of said optical fibre to provide a measurement signal indicative of any acoustic stimuli acting on that sensing portion.

In some embodiments, the temperature sensing could be a secondary detection effect. For instance the optical fibre could be at least partly deployed within or coupled to a material that exhibits temperature changes in response to certain stimuli or in the presence of certain compositions. For instance, sections of the fibre could be coated with a material that exhibits an exothermic or endothermic reaction in the presence of a given chemical composition. Any significant temperature changes in the coated sections could indicate the presence of the composition. Sections of the fibre could also be uncoated to provide a control indication of environmental temperature changes. Therefore, the sensor may be arranged, indirectly, to sense the presence of the composition.

The apparatus of this aspect of the invention provides the same advantages as the methods described above and may be used in any or all of same ways and/or for the same applications as described above.

According to one aspect of the invention, there is provided a leak detection apparatus, comprising a distributed fibre optic sensor apparatus according to the second aspect of the invention, arranged, in use, to lie along the path of a pipeline and detecting of localised temperature changes.

The leak detection apparatus may comprise any of the features of the second aspect of the invention and, in particular, may be further arranged to detect acoustic signals. Such acoustic signals could also provide indication of a leak. The apparatus may therefore be arranged to correlate acoustic events with temperature change events. This may help in detecting a leak, or increasing the certainty that a leak has occurred, or else may provide further indications concerning the nature and/or severity of the leak.

DESCRIPTION OF THE DRAWINGS

The invention will now be described by way of example only with respect to the accompanying drawings, of which.

DESCRIPTION OF THE INVENTION

Figure 1:
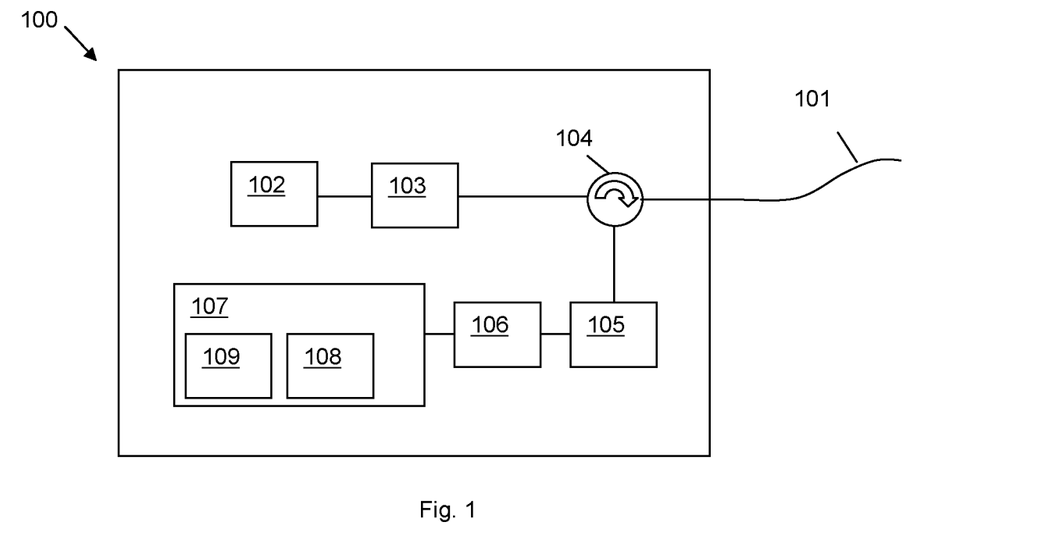
FIG. 1 illustrates components of a distributed acoustic sensor used in embodiments of the present invention.

FIG. 1 shows a schematic of a distributed fibre optic sensing arrangement. A length of sensing fibre 101 is removably connected at one end to an interrogator unit 100. The sensing fibre 101 is coupled to an output/input of the interrogator unit 100 using conventional fibre optic coupling means. The interrogator unit 100 is arranged to launch pulses of coherent optical radiation into the sensing fibre 101 and to detect any radiation from said pulses which is backscattered within the optical fibre 101. For a Rayleigh scattering based fibre optic distributed sensing apparatus, the interrogator unit 100 will detect radiation which has been Rayleigh backscattered from within the fibre 101. To generate the optical pulses the interrogator unit 100 comprises at least one laser 102. The output of the laser is received by an optical modulator 103 which generates the pulse configuration as will be described later. The pulses output from the optical modulator 103 are then transmitted into the sensing fibre 101, for instance via a circulator 104.

Note that as used herein the term "optical" is not restricted to the visible spectrum and optical radiation includes infrared radiation, ultraviolet radiation and other regions of the electromagnetic spectrum.

A proportion of the light in the fibre is then backscattered from scattering sites within the fibre 101. In a simple model, the number of scattering sites can be thought to determine the amount of scattering that could occur and the distribution of such scattering sites determines the interference. A stimulus may result in a change of optical path length within the relevant section of fibre (which could be a physical change in length and/or a change in the refractive index in part of the fibre). In this simple model this can be thought of as changing the separation of the scattering sites but without any significant effect on the number. The result is a change in interference characteristics. In effect, the stimulus leading to optical path length changes in the relevant section of fibre can be seen as varying the bias point of a virtual interferometer defined by the various scattering sites within that section of fibre.

Any optical radiation which is backscattered from said optical pulses propagating within the sensing fibre 101 is directed to at least one photodetector 105, again for instance via the circulator 104. The detector output is sampled by an analogue to digital converter (ADC) 106 and the samples from the ADC 106 are passed to processing circuitry 107 for processing. The processing circuitry 107 processes the detector samples to determine a phase value for each of a plurality of analysis bins, each analysis bin corresponding to a different longitudinal sensing portion of interest of optical fibre 101. The processing circuitry 107 comprises a low pass filter 108, and a noise compensator 109. It will be noted that the interrogator unit 100 may comprise various other components such as amplifiers, attenuators, additional filters etc. but such components have been omitted in FIG. 1 for clarity in explaining the general function of the interrogator unit 100.

Figure 2:
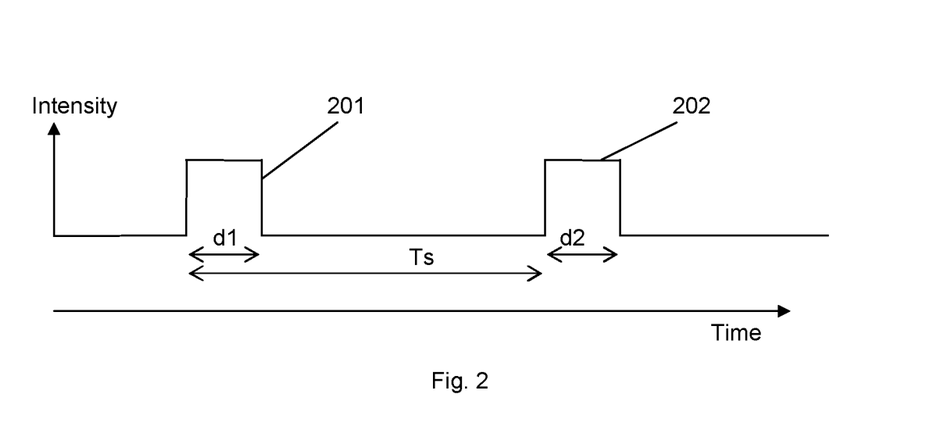
FIG. 2 illustrates an interrogating pulse pair configuration used in embodiments of the present invention.

In embodiments of the present invention, the laser 102 and modulator 103 are configured to produce at least one series of pulse pairs at a particular launch rate. Each pulse pair comprises at least a first pulse and a second pulse and preferably the first and second pulses are separated in time from one another as illustrated in FIG. 2. FIG. 2 shows a first pulse 201 at a first frequency F1 and having a duration d1 followed a short time later by a second pulse 202 having a second frequency F2 and having a second duration d2. In some embodiments the frequencies of the two pulses F1, F2 are equal whereas in other embodiments they are different as will be explained later. Preferably the durations (and hence the spatial widths) of the two pulses d1, d2 are equal to one another although this need not be the case. The two pulses 201, 202 have a separation in time equal to Ts (as shown Ts represents the time separation between the leading edges of the pulses).

When a pulse pair having this type of configuration propagates within the optical fibre 101 some light will be scattered from each of the pulses from the intrinsic scattering sites within the optical fibre 101. At least some of this backscattered light will be guided back to the beginning of the optical fibre 101 where it can be detected. At any instant the light arriving at the detector 105 may comprise light scattered from the first pulse from a first range of scattering sites and light scattered from the second pulse from a second range of scattering sites.

Figure 3:
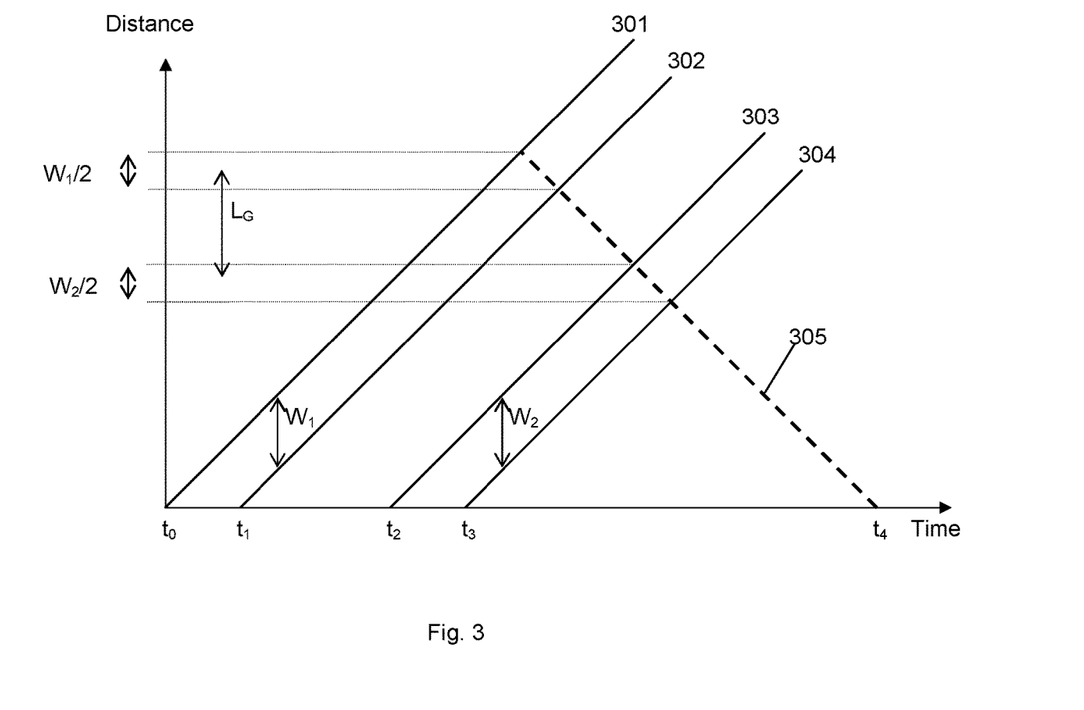
FIG. 3 illustrates how such a pulse pair sets the maximum spatial resolution of the sensor.

FIG. 3 illustrates the propagation of the pulse pair in the optical fibre 101 and shows distance along the fibre 101 against time. Lines 301 and 302 illustrate the leading and trailing edges of the first pulse respectively and lines 303 and 304 the leading and trailing edges of the second pulse respectively. Thus at time $t_0$ the leading edge of the first pulse enters the optical fibre 101 and at $t_1$ the trailing edge of the first pulse enters the fibre 101. The time between $t_0$ and $t_1$ therefore corresponds to the duration of the first pulse, i.e. d1. At a time $t_2$ the leading edge of the second pulse enters the fibre 101 and at $t_3$ the trailing edge of the second pulse enters the optical fibre 101. Thus the time between $t_2$ and $t_3$ is equal to the second pulse duration, d2, and the time between $t_0$ and $t_2$ is equal to the pulse separation time, Ts. The pulses propagate in the fibre 101 at a velocity equal to c/n where c is the speed of light and n is the effective refractive index of the optical fibre 101. Thus the gradient of the lines 301, 302, 303 and 304 are equal to c/n. This means that in the fibre 101 the first and second pulses will have widths equal to $W_1$ and $W_2$ respectively, represented by the vertical distance between lines 301 and 302 and between lines 303 and 304.

As the pulses propagate in the optical fibre 101, some light will be backscattered towards the start of the fibre 101. This backscattered light will also travel at a velocity equal to c/n. Consider the light reaching the detector 105. Line 305 represents the trajectory of light which could possibly be received at the start of the optical fibre 101 at instant $t_4$. Any backscattering which occurs at a time and distance into the fibre 101 that lies on line 305 could be received at the start of the fibre 101 at the same instant $t_4$. Thus it can be seen that light from a first section of fibre 101 illuminated by the first pulse at a first range of times will be coincident with light scattered from a second, different, section of fibre 101 illuminated by the second pulse at a different range of times. It can also be seen that, as any light scattered from a pulse travels backwards to the start of the optical fibre 101 at the same rate as the pulses themselves propagate forwards, the width of the first section of fibre 101 is equal to half the width of the first pulse in the fibre 101, i.e. $W_1/2$ and likewise the width of the second section of fibre 101 is equal to half the width of the second pulse in the fibre 101, i.e. $W_2/2$. Also the physical separation between the first and second sections of fibre 101 is equal to half the physical separation of the pulses in the fibre 101.

Figure 4:
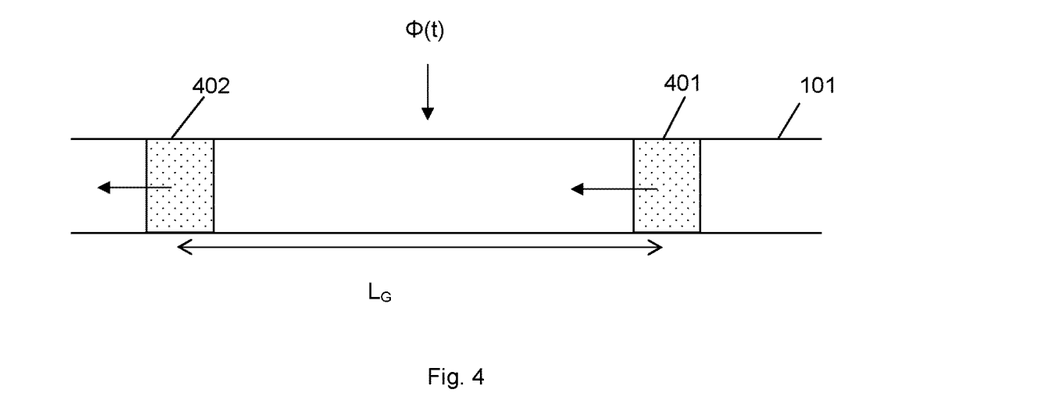
FIG. 4 illustrates the origin of the backscatter signal from within the fibre.

This means that, as illustrated in FIG. 4, at any instance the backscattered light received at the start of the optical fibre 101 corresponds to backscattering in the fibre 101 from a first contributing section 401 of scattering sites illuminated by the first pulse and also from a second contributing section 402 of scattering sites illuminated by the second pulse. The distance between these contributing sections of scattering sites is referred to as the gauge length, $L_G$. As illustrated, the gauge length may be measured between the middles of the sections 401 and 402 of scattering sites.

The backscatter signal received at the detector 105 at any instant is therefore an interference signal resulting from the combination of the scattered light from all of these scatter sites. Effectively the backscatter signal at any instant corresponds to a signal from a travelling interferometer defined by the positions of the scatter sites within sections 401 and 402. It will be appreciated that the backscatter, denoted by the arrow, from all the scatter sites of the second position 402, which will all be at frequency F2, can be considered to interfere to produce a composite signal from the second scatter sites and likewise the backscatter from all the scatter sites of the first section 401, which will all be at frequency F1, can be considered to interfere to produce a composite signal from the first scatter sites. These two composite signals will then also interfere.

Any disturbance to the optical fibre e.g. strain, or thermal expansion or changes in refractive index due to temperature changes in the optical fibre 101 will cause an optical path length change which can therefore phase modulate the interference signal generated by the travelling interferometer. As will be understood, any phase changes occurring on the optical fibre 101 up to the position of the second section 402 of scattering sites will affect the light from the first section 401 and the second section 402 of fibre 101 equally. However any phase modulation OM on the section of fibre 101 between the first section 401 and second section 402 will affect the light from the first section 401 only. This can cause a change in phase of the interference signal. Detecting a phase change in the interference signal from a particular section of fibre 101 can thus be used as an indication of an optical path length change upon the optical fibre 101 (and more particularly in the section of the fibre between the two pulses resulting in the interference signal) and hence as an indication of conditions (temperature, strain, audio, etc) at that section of fibre 101. However, in principle, and as the skilled person will be aware, a single pulse can be used.

Such phase based sensors have the advantage of providing a linear and quantitative response to an incident stimulus.

In this embodiment, the pulse configuration is such that the frequency of the first pulse is different to that of the second pulse, i.e. F1≠F2. This will result in the backscatter interference signal having a component at a frequency equal to the frequency difference between the pulses (|F1−F2|). By monitoring the backscatter at this frequency, any phase modulations due to path length changes can be detected.

In this embodiment of the invention therefore, a series of pulse pairs are launched into the optical fibre 101, wherein each pulse pair in the series has the same frequency configuration, i.e. a pulse of frequency F1 and duration d1 followed a time Ts later by a pulse of frequency F2 and duration d2. The launch rate of the pulse pairs into the optical fibre 101 (also called the ping rate) is related to the carrier frequency of these pulse pairs so that the time between successive launches is equal to the time taken for a signal at the carrier frequency to evolve by a predetermined phase amount. The ping rate also related to the length of the fibre to be interrogated: preferably, the time between each launch is at least that required for the light pulse to reach the far end of the fibre and for the backscatter to return from there. The carrier frequency is normally chosen to be a quarter of the ping rate so that it lies in the middle of the Nyquist band.

This embodiment of the present invention relies on a carrier within the bandwidth of interest being preserved between successive launches of pulse pairs. Thus a pulse pair is launched into the optical fibre 101 and the backscatter signal received at the detector 105 is sampled at intervals to provide a plurality of channels each corresponding to a different set of scattering sites within the optical fibre 101 (albeit that the sets may overlap). The ping rate may be determined by the fibre length and then the carrier frequency is normally chosen to be a quarter of the ping rate. This means that, after a certain interval, which corresponds to the time taken for a signal at the carrier frequency to change by a predetermined phase amount, another pulse pair is launched into the optical fibre 101 and another plurality of samples acquired at the same intervals after launch. This is repeated for as long as it is wished to monitor the optical fibre 101.

For each channel (defined by a certain sampling time after launch of a pulse pair) the successive detector outputs will provide a phase modulated channel signal at the frequency defined by the frequency difference between the pulses of a pulse pair, for example using the modulator 103 to modulate the frequency as is described in greater detail in our previously filed applications WO2012/137022 and WO2012/137021, which are incorporated herein by reference to the full extent allowable.

Each channel signal therefore relates to a portion of fibre (which portions may be discrete, contiguous, overlapping, or arranged in any other way), and, if monitored over time, the phase changes therein are indicative of optical path length changes in that portion.

As also described in our previously filed applications WO2012/137022 and WO2012/137021, there may be a relative phase difference between the pulses of a pair, and this relative phase difference may change from one pulse pair to the next. In one arrangement, which offers processing advantages, the carrier frequency is arranged to be one quarter of the ping rate such that a signal at the carrier frequency evolves by 90° in phase between launch of successive pulse pairs. This also allows for efficient use of modulation bandwidth.

Figure 5:
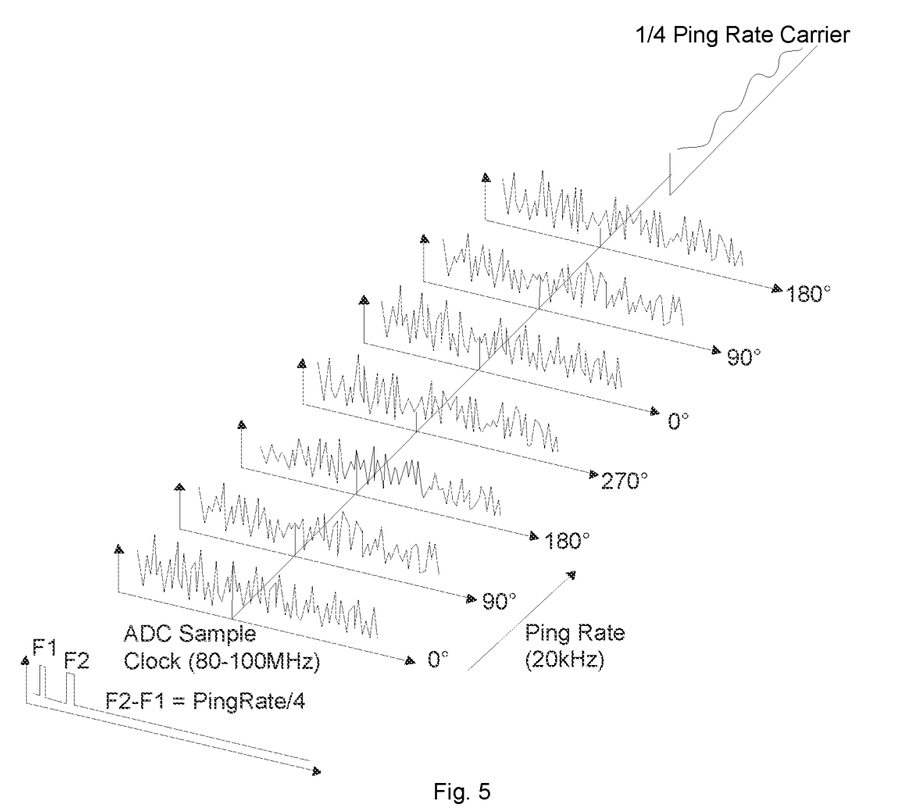
FIG. 5 illustrates the returns from launch of a series of pulse pairs according to an embodiment of the invention.

FIG. 5 illustrates how this embodiment of the invention operates. FIG. 5 illustrates the sampled detector output from a series of successive launches of a pulse pair having the frequency configuration as described above wherein the frequency difference between the pulses in the pair is equal to a quarter of the ping rate, i.e. launch rate of the pulse pairs. In the example shown the ping rate is 20 kHz, which may be a typical ping rate used with a length of optical fibre 101 of the order of 5 km in length or less so as to ensure that only one pulse pair, or the backscatter therefrom, is propagating within the fibre 101 at any one time.

Thus, in this example pulse pairs are launched into the optical fibre 101 every 50 μs and the backscatter return signal generated by the pulse pair as it propagates through the fibre 101 is detected. Following every launch of a pulse pair the detector output is sampled at a relatively high rate, for instance of the order of 80-100 MHz, to detect the backscatter signal from a plurality of different locations within the fibre 101.

At any given position in the optical fibre 101, a variation in backscatter intensity may be observed at the carrier frequency from launch to launch. By comparing the backscatter interference signal from the same section of optical fibre 101 from different pulse pairs, a carrier signal may be detected. FIG. 5 illustrates that by taking the appropriate sample acquired the same time after launch of each pulse pair a carrier signal at frequency equal to one quarter of the launch rate may be detected. This carrier signal will be phase modulated by any path length changes affecting the relevant section of fibre 101 as described above and thus by monitoring the phase of this carrier signal over time any path length changes in the relevant section of optical fibre 101 can be detected.

Figure 6:
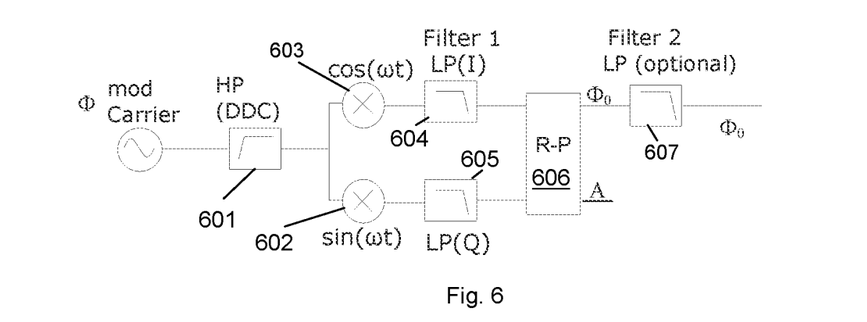
FIG. 6 illustrates one embodiment of processing of the detected signal for a sensor channel.

FIG. 6 illustrates one embodiment of how this modulated carrier signal may be processed by processing circuitry 107 to determine the phase of the carrier signal for a single channel. The samples representing the modulated carrier signal for one channel (i.e. fibre portion) of the sensor may be high pass filtered 601 to remove any components at DC or low frequency. The filtered signal may then be divided into two processing channels and the signals in each channel may be multiplied by sine 602 and cosine 603 functions at the carrier frequency in order to generate quadrature (Q) and In-phase (I) components respectively as is known in complex demodulation schemes. Where the known phase difference is 90° this simply comprises multiplying by, 0, +1 or −1. The resultant I and Q signals may then be low pass filtered by I and Q component low pass filters 604 and 605 prior to conversion to a phase value by rectangular to polar (RP) conversion 606.

RP conversion may optionally also generate an amplitude value. The output signal is fundamentally therefore a phase shift measured in radians over the frequency range from 0 Hz to an upper limit that is determined by the filters 604 and 605.

In similar sensing techniques used to detect acoustic signals (i.e. DAS), this phase shift, $\varphi_0$, may typically be high pass filtered. This is considered advantageous as it eliminates noise signals that lie in the low frequency region. However, in the current application, it is the low frequency changes which are of interest and therefore the phase value is low pass filtered to remove acoustic effects and to that end the data is passed to a low pass filter 607. In practice, the high frequency signal portion could be retained and processed separately for acoustic sensing, thus providing a combined DAS and temperature (and/or other slow acting changes) sensor. The cut off frequency of the low pass filter is preferably predetermined. It will be appreciated by the skilled person that there is no well-defined distinction between acoustic signals and temperature signals, and therefore the cut-off may be determined according to the intended operating environment. However typically the boundary may be taken to be somewhere between 0.1 and 1 Hz. This is further described below.

In alternative embodiments, the thresholds of the I and Q component low pass filters 604 and 605 may be selected to isolate, or substantially isolate, the low frequency components of the phase signal, and the subsequent phase value low pass filter 607 may not be required. As the skilled person will appreciate, such filters are provided to remove the 'double-frequency' components generated in the mixing stage of producing the I and Q components, and may be also used to remove any component at the carrier frequency which results from any remaining low frequency input signal being multiplied by the sin and cos terms. To that end, the threshold is generally set to be less than the carrier frequency. For example, the low pass filters may be set to have a cut-off at $\frac{1}{3}^{rd}$ of the carrier signal frequency (which may be, for example, in the kilohertz range), which will preserve all signals imposing path length changes in the optical fibre at that frequency and below. However, in this example, it is the low frequency signals which are of interest, the low pass filters 604 and 605 could instead have a much lower cut off, of for example 100 Hz or lower. This also assists in improving the stability of the demodulation as explained below.

The stability of the demodulation process depends on sufficient light having been backscattered from the two pulses to generate a carrier with sufficient carrier to noise ratio. Looking again at FIG. 4, the light reflected from the second pulse is the combination of that from all the scattering sites in region 402. These scattering sites are effectively distributed randomly within the fibre 101. For some sections of the fibre 101, light backscattered will tend to interfere constructively giving a large backscatter level from the second pulse while for other sections there will be more destructive interference resulting in a much lower backscatter level. If the backscattered light from either of the two pulses falls then the carrier level generated by mixing them together will decrease. A lower carrier level will mean that the I and Q components become noisier and if the noise level becomes too large then phase obtained from them will show a series of $2\pi$ radian jumps thereby corrupting the data. The probability of these $2\pi$ jumps occurring is inversely related to the total noise level on the I and Q components. As this noise is broadband its level can be reduced by using a lower frequency cut for filters 604 and 605 in FIG. 6. Therefore reducing this bandwidth reduces the chances of generating a $2\pi$ jump in the data and so the stability of the demodulation process is improved.

The task of isolating the low frequency signal can be shared between the I and Q component low pass filters 604, 605 and the phase value low pass filter 607, or may be carried out by the I and Q component low pass filters 604, 605, or by the phase value low pass filter 607. However, it is only the lowering the cut off threshold of the I and Q component low pass filters 604, 605 which improves the stability of the demodulation, as described above.

It will also be appreciated that the threshold selected for filtering depends on the signal of interest. Generally, the filter(s) should be designed to retain all of the signal of interest. Considering the example of temperature, therefore, when designing the system, the anticipated temperature variation and the speed with which the fibre reacts should be considered, and an upper frequency threshold which preserves the fastest changing value of the anticipated changes selected.

In certain examples, the temperature signal will be the dominant signal. This has been found to be the case in tight gas well downhole DAS sensing. In such examples, it may be possible to isolate the low frequency signals of interest by removing other signals, for example effectively categorising them as noise.

Assuming that the low frequency phase change is largely due to temperature change, the temperature variation may be determined from the suitably filtered data and then multiplying it by a predetermined temperature/phase relationship of the fibre cable. The temperature/phase relationship will depend on the fibre cable used. In general, the temperature/phase relationship for a bare fibre is well known but this may be modified if extra coatings are placed on it or if it is included in a cable structure. The temperature/phase relationship for a particular cable could be calculated or experimentally measured. If the primary aim of a particular distributed sensing system is to measure temperature changes, a fibre which will generate a large change in phase with temperature may be used. This could for example be obtained by using fibres with a coating of a material (which may be a relatively thick coating to enhance the effect) with a high thermal expansion coefficient.

Knowledge of the actual temperature variations may be useful because it enables signals from different locations to be compared, which may in turn help develop a better understanding of how various processes cause temperature variations around the sensing fibre.

For a dual pulse system therefore the conversion of phase to temperature can be carried out for any amplitude of signal. For single pulse systems this is not possible due to the well-known signal fading issue. However for large slow temperature variations that cause wrapping of the signal, is it possible to estimate the rate of phase change and hence temperature change in a single pulse system.

If a laser 102 and/or modulator 103 exhibited frequency drift over time this would result in an unknown modulation of the pulse frequencies. In a conventional DAS sensor, any such variation in frequency would thus alter the response of the various channels as discussed above. As the frequency drift of the laser occurs over a relatively long timescales, this results in a low frequency noise signal (of the order of a few tenths of Hz or lower). Therefore, for acoustic monitoring, the noise signal itself may not be a significant problem as it lies in a different wave band to the signal of interest, but it is likely to be so when measuring low frequency effects such as temperature changes. To reduce this noise the interrogation system (e.g. interrogator unit 100) may use as stable a laser as possible. However, alternatively or additionally, it may be desirable to detect and possibly compensate for the effects of such laser noise.

As noted above, in acoustic sensing systems, the phase data may be high pass filtered. This is primarily to remove system noise, which lies outside the signal of interest in acoustic sensing systems (i.e. the audio signal) but lies in the same band as the signal of interest in this example (temperature or slow strains). At frequencies less than 1 Hz (where thermal signals dominate), laser phase noise can be a significant component (often the major component, in particular if less stable lasers are used) to the overall noise level and additional processing steps may therefore, in some embodiments, be taken to remove this.

Figure 7:
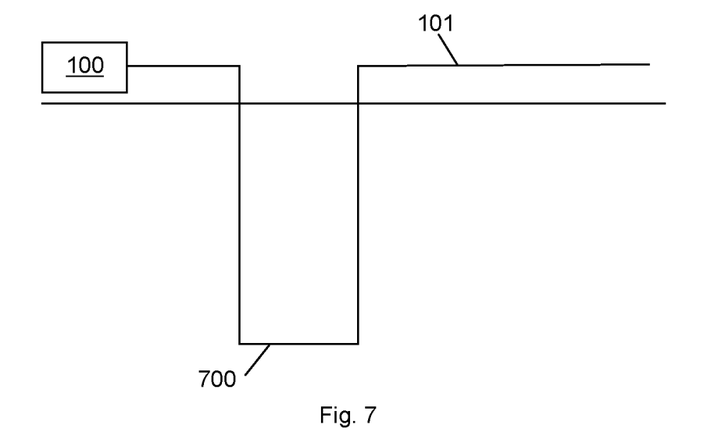
FIG. 7 illustrates one embodiment of a sensor comprising a fibre portion which is substantially shielded from at least some low frequency signals.

For a dual pulse system, laser phase noise produces a signal that is the same throughout the fibre so it can be removed if any section of the fibre under test is in a temperature stable environment, e.g. buried at deep underground, or having its temperature controlled. Such a system is illustrated in FIG. 7, in which the fibre 101 under test has a shielded section 700, in this example, a deeply buried section. The shielded section could also be isolated from strain e.g. by mounting a coil of fibre in a box in such a way that any strain imparted onto the box is not transmitted to the fibre. This could for example be done by using a very compliant coupling between the box and the fibre. The low frequency signal from the shielded fibre portion 700 therefore provides an estimate of laser phase noise, and this may be subtracted from the signals of the other fibre channels to remove the laser phase noise from all other measurement channels by the noise compensator 109.

Alternatively or additionally, an estimate of the laser phase noise can be made be taking the mean signal of all, or some of, the samples (i.e. from each portion, or channel, of the fibre along its length), though this approach assumes that temperature variations at different sections of the fibre are uncorrelated. This estimate can be used by the noise compensator 109 to remove noise as outlined above.

In the dual pulse system described in particular in WO2012/137021, a plurality of samples corresponding to each sensing portion of interest are acquired (these samples may be acquired from overlapping sections of fibre) and designated as separate channels for processing. The channels may be combined according to a quality metric, which may be a measure of the degree of similarity of the processed data from the channels. This allows for samples which have a high noise level, for example due to fading of the carrier signal, to be disregarded, or given a low rating in the final result.

The signals are DC coupled and drift away from zero so each one is likely have a different offset. In order to ensure that this DC offset does not dominate the signal (and therefore impact in particular the determination of which signals were most similar to others), the process described first passes all the data through a high pass filter (which might be set at, for example 1 Hz).

Such a high pass filter may also remove thermal information. Therefore, to ensure that this information is retained but that the benefits of the method described in WO2012/137021 are maintained in the context of low frequency phase modulation, the method may be implemented without high pass filtering. Instead of choosing the channels which are most similar, the quality metric may be based on a determination of the level of signal at high frequency (with lower levels being favoured), or the ratio between the signal at low frequency (e.g. 2-20 Hz), the signal at high frequency (with higher ratios being favoured), or the maximum differential of the signal with respect to time. These methods are not affected by the level of the DC offset and are based on the fact that most signals due to physical disturbances have a higher level at low frequencies, while the system noise, which depends on the variable carrier level, has a flatter spectrum.

Without additional processing when there is a change in the selection of channels for combination, there is also likely to be a step in the output signal as the new set of channels would generally have a different mean offset to the old set.

Therefore a DC offset may be added to the mean of the selected channels to give the output signal. When the set channels changes, in order to avoid a step change in the output, the difference between the mean of the new set and the old set may be considered and the DC offset may be set to remove any step change. In particular, the mean of several successive samples of channels may be considered and the DC offset change may be smoothed over a number of such sample sets so that there is no step in the data, effectively tapering the data from old to the new set of channels produces a smoother join.

Figure 8:
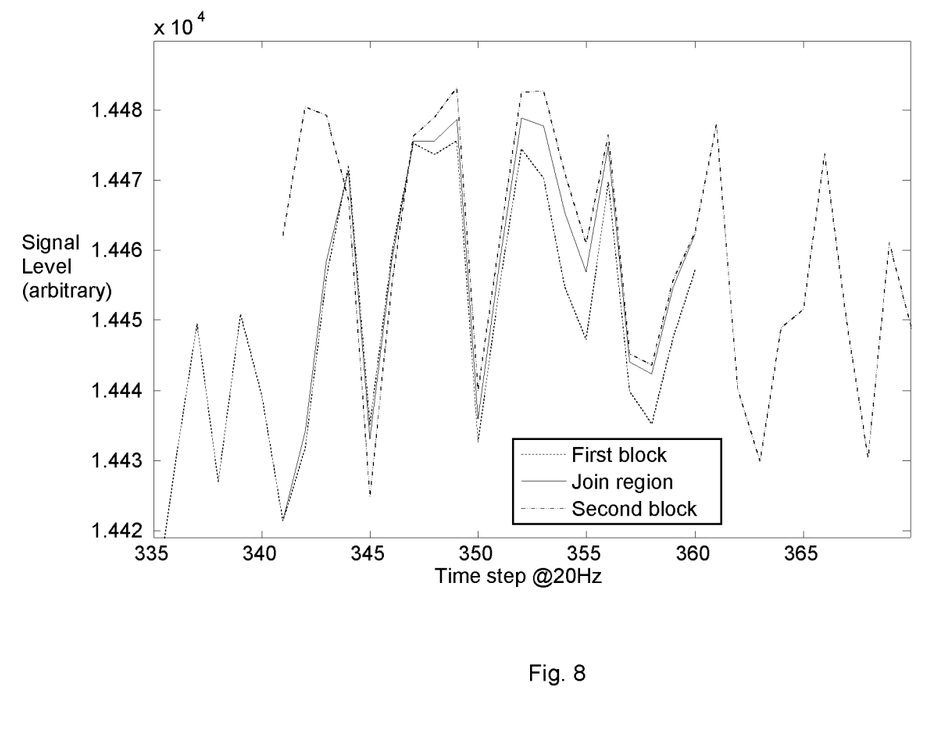
FIG. 8 shows an example of tapering the change between a first and second data block.

A specific example of such tapering is shown in FIG. 8. In this example, the quality metric has to be determined using a first block of data (wherein a block is any length of time in which the choice of channels does not change). In the example of FIG. 8, two blocks of data which overlap by 20 samples are shown. Although the mean levels have already been adjusted to match, the overlapping regions are not the same so a simple change from using the first block to using the second block would cause a discontinuity, i.e. a step change in the data. Therefore the 'join region' data is generated for the overlapping region. Initially, in the join region, a signal which is the same as that of the first block is generated. This gradually changes to be the mean of the signals for the two blocks halfway through the overlap, and finally matches the signals in the second block at the end of the overlap.

A quality metric may be determined on a rolling basis or periodically. In any event, the number of samples in the join region may be lower than any block length so as to ensure that the block length is such that multiple changes during the join region can be avoided. This can be controlled either by setting a minimum block length, or setting the number of samples which contribute to a join, or both, and could be predetermined or vary according to the data collected.

As will be appreciated, such a quality metric is used to ensure to ensure that 'good quality' data is emphasised in the processed data. However, in other examples, after 'bad data' has been identified, it could simply be replaced with 'good data' from surrounding channels.

For example, as noted above, demodulation failure may be identified by looking for steps of multiples of 2 π between samples. In practice, this may occur over several samples, such that the full 2 π change may be made over 5, 10 or more samples from different pulse pairs. Therefore, the threshold for detecting a change might be set below 2 π, for example 60% of a 2 π change, measured across the difference of five samples from different pulse pairs, although other thresholds and sample spacing may be appropriate depending on the data set and sample rate.

Samples may be considered from within a time frame of, for example, a second (although other periods may be appropriate for a given sample set). If the characteristic of demodulation failure is detected, this data may simply be replaced one or more neighbouring channels which do not exhibit the characteristic. In one example, if both adjacent channels have not exhibited the characteristic, then the average of these channels may be used. If no adjacent channels are 'good', then data from the closest good channel may used. As described in relation to FIG. 8, it may be desirable to adjust or taper the join between data sets.

Following 'repair' in this way, the data may be downsampled, (for example decimated by 100). Such downsampling may be carried out using one or more of Finite Impulse Response (FIR) filter, through use of a signal processing tool such as the decimation tool in MATLAB or the like. Additional filtering and/or normalisation may be carried out.

Following such decimation, trends in the data will be apparent. It will be noted that this technique relies on the fact that relatively few channels will suffer from demodulation failure, but this is consistent with observed results. It has also been observed that channels suffering from demodulation failure may remain in that state for some time, for example hours.

In some circumstances, such a method will preserve more original data than methods using, for example, weighted averages with reference to a quality metric.

Other methods may be used to assist in identifying data which is likely to suffer from demodulation failure. For example, channels that have a low carrier to noise ratio (CNR), which is typically observed prior to, and after periods of demodulation failure may be identified. Therefore, CNR could be used to indicate an anticipated state of demodulation failure and/or data exhibiting low CNR could be replaced as outlined in relation to demodulation failure above.

Figure 9:
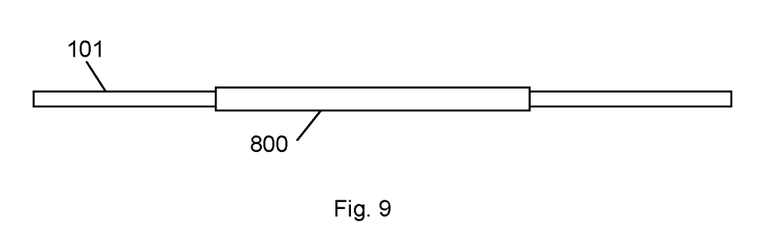
FIG. 9 illustrates one embodiment of a fibre comprising a coating.

In some embodiments the temperature sensing could be a secondary detection effect. For instance, and as shown in FIG. 9, the optical fibre 101 could be at least partly deployed within or coupled to a material that exhibits temperature changes in response to certain stimuli or in the presence of certain chemical compounds. As illustrated, a section of the fibre 101 comprises a coated section 800, and in this example is coated with a material that exhibits an exothermic or endothermic reaction in the presence of the compound. Any significant temperature changes in the coated section 800 could indicate the presence of the compound. Uncoated portions of the fibre 101 could provide a control indication of environmental temperature changes. In other examples, there may be more than one coated section 800, and the coated section(s) 800 could be arranged to respond to different compounds, or simply to enhance the response of the fibre to environmental temperature changes, or the like.

Figure 10:
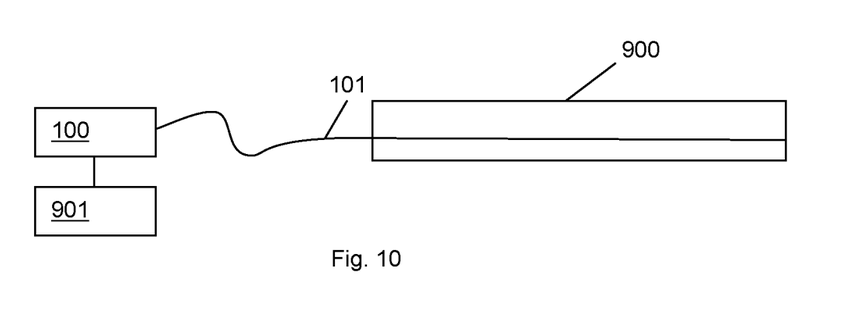
FIG. 10 shows a leak detection apparatus according to one embodiment of the invention.

FIG. 10 shows an embodiment of a leak detection apparatus according to one aspect of the invention. In this embodiment, a fibre 101 is arranged along a pipeline 900. Alongside the sensor apparatus 100, as described above, is a DAS apparatus 901, arranged to determine an acoustic signal from the pulses, as would be familiar to the skilled person. While the fibre 101 could contain a junction arranged to split the returned signal, and the signal portions could then be processed separately, splitting would reduce the returning optical signal and so increase the noise level. Therefore, it may be preferred to carry out splitting of the signal to obtain different frequency components in the signal processing. To this end, the high frequency portion of the signal removed by the low pass filters describe above could be retained and sent for separate processing by the DAS apparatus 901 to provide an acoustic signal.

Figure 11:
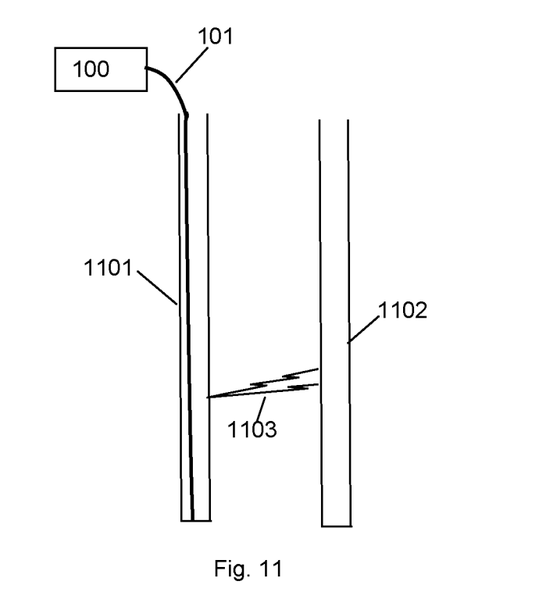
FIG. 11 shows another embodiment of the invention where the fibre is installed in an oil or gas well with a second well nearby.

FIG. 11 shows a further embodiment of the invention in which the sensing fibre 101 is installed in an oil or gas well 1101 and used to monitor temperature changes induced by the motion of fluids either into or along the well. Such measurements could be used to provide information on a number of downwell process such as flow rates at different depth. Also, as is known by those skilled in the art, in some types of field fracking is required to release oil or gas. If fracking was carried out in a nearby well 1102 and a frack 1103 reached well 1101 this may also cause temperature changes that could be detected and this would provide useful information to the fracking operator about distance that the fracks had reached from well 1102.

Note that as used in this specification the term interrogation shall be taken to mean an instance of launching interrogating radiation into the fibre and detecting the backscatter signal from the fibre. Typically an interrogation may comprise a single or multiple distinct pulses that are relatively closely spaced. In such sensors the backscatter signals from the two pulses are intended to interfere at the detector 105 to provide the measurement signal but again successive interrogations are arranged so as to not interfere. For example therefore, in the embodiment described above, the first pulse pair in the series of pulse pairs has the same frequency configuration, that is a first pulse at a frequency F1 and a second pulse at a frequency F2, then if the backscatter signal from two different pulses pairs was incident on a detector 105 at the same time the backscatter signals would interfere with another at the relevant carrier frequency. Hence the launch rate of the pulse pairs may be limited so as to ensure that radiation from only one pulse pair is present in the optical fibre 101 at any one time.

However, wavelength division multiplexing techniques can be used with pulses of different wavelength being launched at staggered intervals such that multiple pulses may be propagating in the fibre at the same time. In effect a first series of interrogations at a first wavelength may be interleaved with a second series of interrogations at a second wavelength. However only the backscatter intensity from pulses of the same wavelength are compared to determine any change in intensity to detect any stimulus and only one interrogation of each wavelength is propagating within the sensing fibre at any time. The backscatter signal from a first interrogation does not interfere with the backscatter signal of a second interrogation at the frequencies of interest for the first and second interrogations (although there may be some effects at other frequencies). This can lead to a first measurement from the first series of interrogations at the ping rate and an interleaved second measurement from the second series of interrogations, also at the ping rate. The two measurement signals may be combined to provide a single measurement signal with an update rate faster than the ping rate.

Instead of combining or choosing data from a plurality of channels, which each represent different (though possibly overlapping) sections of fibre, to provide a single output signal, measurements could be made at multiple wavelengths, and then the signals from each wavelength for the same section of fibre could be similarly combined. The decision as to which wavelength channels to use could again be based on a quality metric. This use of multiple wavelengths has the advantage that all measurements being combined are for exactly the same section of fibre.

It should be noted that the explanation given above in relation to backscattering in an optical fibre is a relatively simplistic explanation of the various interactions in a sensing fibre to highlight several factors that provide the variation in operating point the various channels of an intensity-based Rayleigh 'DAS' sensor. It should be considered that there may be variations in response, i.e. for a given channel the response to a given input stimulus may be non-linear and also the gain of the channels, i.e. the amount intensity change for a given stimulus is variable.

In some embodiments the sensor may be operated to detect acoustic stimuli acting on the sensing fibre in addition to providing sensing for temperatures or slow acting strain variations.

Embodiments of the invention may be arranged as part of an interrogator unit for a distributed fibre optic sensor or as an add-on or retrofit to such an interrogator unit. Embodiments of the invention may be implemented as temperature change sensors or distributed acoustic sensor a sensor with combined DAS/temperature variation capability. The method may be implemented by software. In addition, if a Distributed Temperature Sensing (DTS) system is used to measure the temperature on either the same on a nearby fibre, the DTS and DAS temperature measurements could be advantageously combined, the DTS providing the absolute temperature and the DAS providing information about changes that are too small and/or rapid to be measured by DTS.

The invention has been described with respect to various embodiments. Unless expressly stated otherwise the various features described may be combined together and features from one embodiment may be employed in other embodiments.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

The invention claimed is:

1. A method of distributed fibre optic sensing comprising:
performing a series of interrogations of an optical fibre, each interrogation comprising:
launching interrogating radiation comprising at least one pulse pair into the fibre, wherein the pulses of a pulse pair are introduced to the optical fibre with a time interval therebetween; and
sampling radiation which is Rayleigh backscattered from within said fibre to obtain at least one sample from each interrogation; and
determining any phase modulation in the samples, wherein the step of determining the phase modulation comprises isolating components of the phase modulation which are below a threshold frequency, wherein the threshold frequency is between 0.1 and 1 Hz.

2. A method according to claim 1 comprising using the isolated components of the phase modulation to monitor temperature changes.

3. A method according to claim 1 in which the step of isolating the components of the phase modulation which are below a threshold frequency comprises at least one step of low pass filtering.

4. A method according to claim 1 in which the step of sampling obtaining a plurality of samples from each interrogation, each of the samples being obtained at a different time following launch of the pulse pair, and processor is arranged to form at least one channel signal comprising samples of the backscatter radiation acquired at substantially the same time after launch of each pulse pair; and the step of determining the phase modulation comprises demodulating the channel signal.

5. A method according to claim 4 in which the step of demodulation comprises determining In-phase and Quadrature components of the channel signal and determining phase modulation therefrom.

6. A method according to claim 5 in which the step of isolating the components of the phase modulation which are below a threshold frequency comprises low pass filtering the In-phase and Quadrature components.

7. A method according to claim 4 which comprises determining a failure in demodulation in at least one channel, and, in the step of determining the phase modulation, phase data relating to channels in which demodulation failure is determined is replaced with phase data from at least one other channel.

8. A method according to claim 1 in which the radiation sampled is an interference signal arising from interference of radiation backscattered from the pulses of a pulse pair.

9. A method according to claim 1 which further comprises compensating for noise in the interrogating radiation.

10. A method according to claim 9 which comprises providing a portion of the fibre which is at least substantially shielded from at least some effects resulting in a phase modulation below the threshold frequency and using the backscatter signal from this shielded section of fibre to provide an indication of laser phase noise.

11. A method according to claim 9 which comprises determining the mean signal returned from at least some portions of the fibre and using the mean signal to provide an estimate of laser phase noise.

12. A method according to claim 1 which further comprises dividing a plurality of samples into a plurality of processing channels, each corresponding to samples originating from sections of the fibre, where the sections are arranged to overlap, at least in part, with a fibre sensing portion of interest.

13. A method according to claim 12 which further comprises processing at least some of said plurality of processing channels to determine at least phase data for said channel; applying a quality metric to the data from processing channels; and combining the determined phase data for said channels into an overall phase value for the fibre portion of interest based on the results of applying said quality metric.

14. A method according to claim 13 in which the quality metric is based on at least one of (i) determination of the level of signal at high frequency, (ii) the ratio between the signal at low frequency and the signal at high frequency, and (iii) the maximum differential of the signal with respect to time.

15. A method according to claim 13 which comprises using the quality metric to select the best channels to be combined and further comprises producing output data by adding a DC offset to the mean of the channels selected through use of the quality metric, wherein, when the selected channels change, the processor determines the difference between the mean of the newly selected set of channels and the previously selected set of channels and adjusts the DC offset to obtain a smooth transition between output data obtained from the newly selected set of channels and the previously selected set of channels.

16. A method according to claim 1 which comprises a method of determining temperature changes in a fibre, the method further comprising determining a temperature change using a predetermined relationship between the phase change and the temperature change of the fibre.

17. A distributed fibre optic sensor apparatus comprising:
an optical source configured to, in use, launch a series of interrogations, each interrogation comprising a pulse pair, into an optical fibre, wherein the pulses of a pulse pair are introduced to the optical fibre with a time interval therebetween;
a sampling detector configured to, in use, sample radiation which is Rayleigh backscattered from within said optical fibre from the interrogations; and
a processor configured to determine any phase modulation in the samples, and to isolate components of the phase modulation below a threshold frequency, wherein the threshold frequency is between 0.1 and 1 Hz.

18. A distributed fibre optic sensor apparatus according to claim 17 in which the sampling detector is configured to sample backscatter radiation at substantially the same time after launch of each pulse pair, and processor is arranged to form at least one channel signal comprising samples of the backscatter radiation acquired at substantially the same time after launch of each pulse pair; and said channel signal is demodulated to determine the phase modulation for the channel signal.

19. A distributed fibre optic sensor apparatus according to claim 18 in which the channel signal is a phase modulated carrier signal produced from interference between radiation backscattered from each pulse pair of the series of pulse pairs.

20. A distributed fibre optic sensor apparatus according to claim 19 in which the processor is arranged to demodulate the channel signal to derive In-Phase and Quadrature terms therefrom.

21. A distributed fibre optic sensor apparatus according to claim 20 in which at least one low pass filter is arranged to filter the In-Phase and Quadrature terms.

22. A distributed fibre optic sensor apparatus according to claim 17 in which the optical source comprises a laser and the processor is arranged to estimate laser phase noise.

23. Leak detection apparatus comprising a distributed fibre optic sensor apparatus according to claim 17, wherein the fibre is arranged, in use, to lie along the path of a pipeline and the processor is arranged to detect localised temperature changes in the fibre.

24. A well monitoring apparatus comprising a distributed fibre optic sensor apparatus according to claim 17, wherein the fibre is installed down an oil or gas well and used to monitor temperature changes that are induced by the motion of fluids into or along the well.

* * * * *